United States Patent [19]
Laakmann et al.

[11] Patent Number: 5,646,765
[45] Date of Patent: Jul. 8, 1997

[54] LASER SCANNER

[75] Inventors: Peter Laakmann, Bothell; Yong Fang Zhang, Kirkland; Keith L. Hayes, Newport Hills, all of Wash.

[73] Assignee: Synrad, Inc., Mukilteo, Wash.

[21] Appl. No.: 485,045

[22] Filed: Jun. 7, 1995

Related U.S. Application Data

[63] Continuation-in-part of Ser. No. 318,065, Oct. 5, 1994, abandoned.

[51] Int. Cl.⁶ ................................................ G02B 26/08
[52] U.S. Cl. ...................... 359/202; 359/201; 250/234
[58] Field of Search ........................... 359/201, 202, 359/205–206, 216–219; 250/234–236; 347/258–261; 348/203, 205; 358/296, 302, 474

[56] References Cited

U.S. PATENT DOCUMENTS

| | | | |
|---|---|---|---|
| 3,717,772 | 2/1973 | Engman | 359/202 |
| 3,764,192 | 10/1973 | Wheeler | 359/201 |
| 4,003,626 | 1/1977 | Reinke et al. | 359/202 |
| 4,024,545 | 5/1977 | Dowling et al. | 346/76 L |
| 4,311,384 | 1/1982 | Keene | 250/236 |
| 4,314,154 | 2/1982 | Minoura et al. | 359/201 |
| 4,318,582 | 3/1982 | Minoura et al. | 359/202 |
| 4,714,830 | 12/1987 | Usui | 250/234 |
| 5,048,904 | 9/1991 | Montagu | 359/202 |
| 5,130,838 | 7/1992 | Tanaka et al. | 359/200 |
| 5,161,045 | 11/1992 | Hutchin | 359/197 |
| 5,168,386 | 12/1992 | Galbraith | 359/215 |
| 5,185,676 | 2/1993 | Nishiberi | 359/202 |
| 5,383,052 | 1/1995 | Okazaki et al. | 359/204 |
| 5,430,666 | 7/1995 | DeAngelis et al. | 364/571.01 |

OTHER PUBLICATIONS

Smith, *Modern Lens Design*, McGraw-Hill, Inc., New York. 1992, Chapter 22, "Scanner/f-Θ and Laser Disk/Collimator Lenses," pp. 411–430.

*Primary Examiner*—James Phan
*Attorney, Agent, or Firm*—Seed and Berry LLP

[57] ABSTRACT

A laser scanner having first and second scanning mirrors and a correction circuit that removes distortions caused by interaction between the scanning mirrors. Preferably, the first scanner mirror is an off-axis mirror that is positioned to produce a single, substantially invariant pupil on the second scanning mirror. Preferably the scanner uses a reflective beam expander to magnify an input laser beam received from a laser source. Preferably, the reflective beam expander is implemented using two spherical mirrors positioned to form the input laser beam into a Z-folded beam path. The folded beam path increases the distance between the laser source and the focusing lens, which results in a clear focused spot and does so using spherical mirrors which are much less expensive than the infrared lenses used in the prior art. The reflective beam expander is also wavelength insensitive. In one embodiment, the correction circuit employs analog elements to implement a quadratic approximation of the geometric distortions caused by interaction of the scanning axes. In another embodiment, the correction circuit employs programmable logic devices to create corrected mirror control signals based on correction values stored in digital memory units.

19 Claims, 9 Drawing Sheets

LASER SCANNER

CROSS-REFERENCE TO RELATED APPLICATION

This application is a continuation-in-part of U.S. application Ser. No. 8/318,065, filed Oct. 5, 1994, now abandoned.

TECHNICAL FIELD

The present invention relates to high-speed laser marking or positioning systems and, in particular, to laser scanners having high linearity.

BACKGROUND OF THE INVENTION

Laser scanners are currently being used for numerous applications, including electronic component marking, fine engraving, micro-assembly soldering and welding, scribing and various other repetitive production operations involving near infrared or far infrared lasers. Laser scanners employ optical elements, usually mirrors and lenses, to direct a laser beam at an object being scanned. The optical elements are programmable to allow the surface of the object to be scanned in two dimensions.

Figure 1:
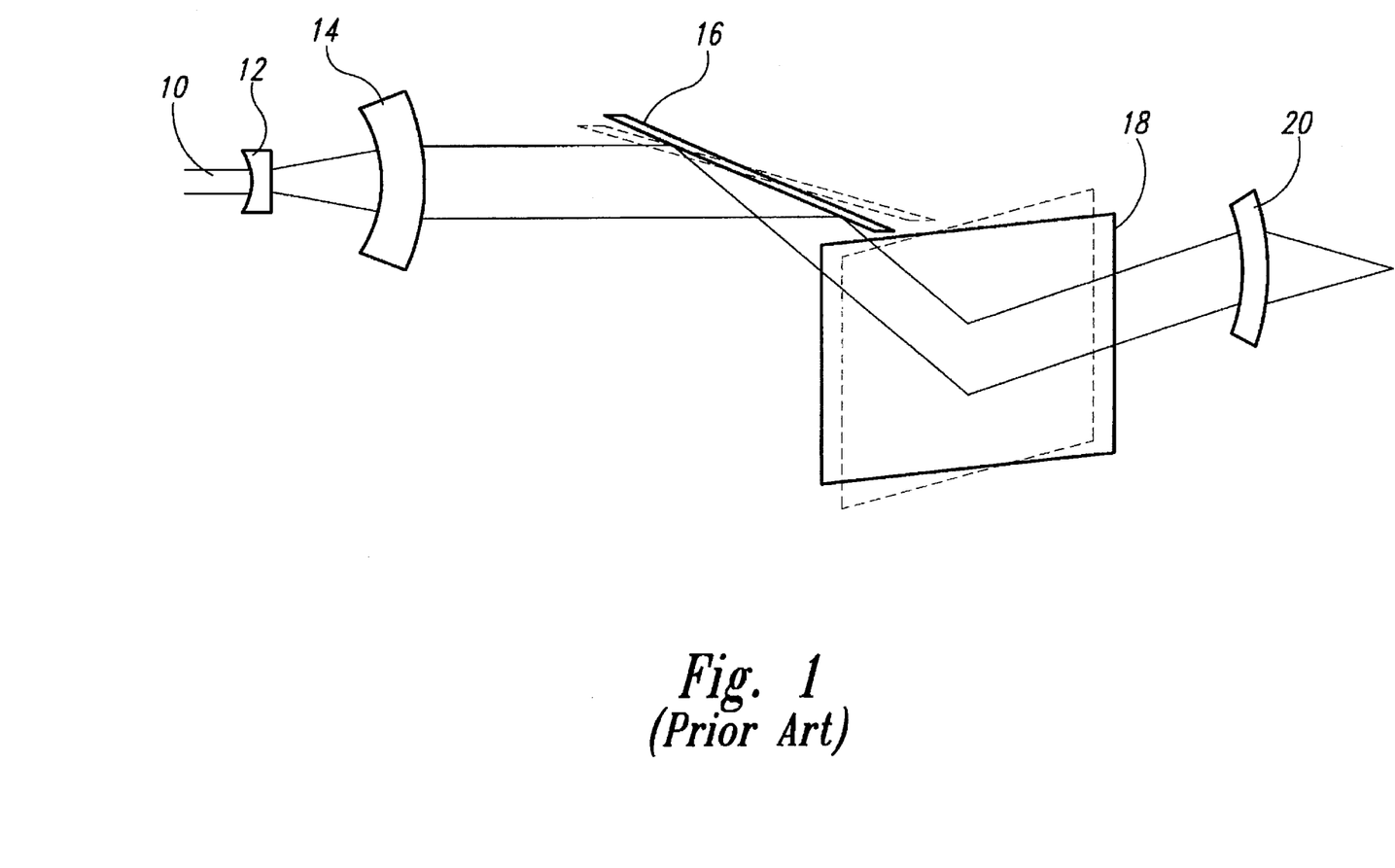
FIG. 1 is a schematic diagram of a prior art laser scanner.

A typical prior art laser scanner is shown in FIG. 1. A laser source (not shown), typically a Yttrium-Aluminum-Garnet (YAG) laser or Carbon Dioxide ($CO_2$) laser, supplies an input laser beam 10 to a refractive beam expander 11. The beam expander 11 typically uses a negative input lens 12 and a positive collimation lens 14 to magnify the input laser beam. The laser scanner includes two galvanometer-operated mirrors positioned along the optical axis, one mirror 16 deflecting the expanded beam in an X dimension and the other mirror 18 deflecting the beam in a Y dimension. A focusing lens 20 focuses the twice-deflected laser beam onto the object being scanned. The focusing lens typically is of flat field F$\theta$ type, having approximate proportionality between input field angle and image displacement.

Each mirror is controlled by a computer-driven servo that corrects for distortions in the system. Typically, the servo includes a microprocessor coupled to read-only memory (ROM) that stores a lookup table calibrated to provide correction values for every combination of mirror angles. The microprocessor is programmed with appropriate software that looks up the correction values for a given combination of mirror angles.

Several deficiencies exist in such prior art systems. One deficiency is that the system is overly complex, and therefore expensive, due to the large number of infrared lenses needed to implement the beam expander and the focusing lens. These infrared lenses must be anti-reflection coated and are usually changed for different laser wavelengths. A second deficiency is that the X and Y positioning is accomplished in axially spaced galvanometer-driven mirrors, causing pupil astigmatism with the imaging/focusing lens. The imaging/focusing lens and scanning mirrors have to be made larger to accommodate the axially shifting pupil. This causes optical inefficiencies and the use of more expensive infrared glass. The ill-defined optical pupil also causes optical distortions that must be removed with the ROM look up tables.

A third deficiency is that using software to obtain correction values suffers from speed limitations. The speed at which corrected mirror values can be presented to the mirrors is reduced because computer code is required to implement the software correction regardless of the, software algorithm employed. In a high performance scanning system such reduced speed provided by software correction schemes is unacceptable. Near real-time software correction is possible using plural microprocessors, but the additional microprocessor greatly increases the cost and complexity of the system.

SUMMARY OF THE INVENTION

It is an object of the invention to create an optical laser scanner that operates with a single optical pupil.

It is another object of the invention to create an optical scanner that achieves substantial linearity and lack of distortion without using a software correction scheme.

It is a further object of the invention to provide a simplified laser scanner optical system to reduce costs and make it easier to change the laser wavelength used.

Yet another object of the invention is to decrease the size of the imaging/focusing lens to reduce the size and fabrication costs of the laser scanner.

These and other objects are accomplished in a preferred embodiment of the invention directed to a laser scanner having first and second scanning mirrors and a correction circuit that removes distortions in an output laser beam caused by interaction between the scanning mirrors. Preferably, the first scanning mirror is oriented to cause an angular displacement in the output laser beam in an X-direction with respect to a Z-axis and the second scanning mirror is oriented to cause an angular displacement in a Y-direction with respect to the Z-axis. Preferably, the first scanner mirror is an off-axis mirror that is positioned to produce a single, substantially invariant pupil on the second scanning mirror. In a preferred embodiment, the scanner uses a reflective beam expander to magnify an input laser beam received from a laser source. Preferably, the reflective beam expander is implemented using two spherical mirrors positioned to form the input laser beam into a Z-folded beam path. The folded beam path increases the distance between the laser source and the focusing lens, which results in a clean focused spot. In addition, the spherical mirrors used to create the folded beam path are much less expensive than the infrared lenses used in the prior art.

In a first embodiment, the correction circuit implements a quadratic approximation of the geometric distortions caused by interaction of the scanning mirrors. The correction circuit implements the quadratic approximation in real-time using analog multipliers and adders. Using such an analog correction circuit provides much faster distortion compensation than prior art systems employing a software correction scheme.

In a second embodiment, the correction circuit is implemented digitally using a programmable logic device (PLD) and a read-only memory (ROM) for each scanning mirror. Each ROM stores a lookup table of correction values calibrated for each combination of scanning mirror angles. The PLDs look up the correction values in the ROM lookup tables appropriate to uncorrected input values and add the correction values to the uncorrected input values to obtain corrected output values that are used to set the scanning mirrors at appropriate angles. Using such PLDs provides much faster distortion compensation than prior art systems employing a software correction scheme due to the ability to implement the corrections using only combinational logic.

DETAILED DESCRIPTION OF THE INVENTION

The invention is directed to a laser scanner for high-speed laser marking or positioning systems. In a preferred embodiment, the laser scanner has first and second scanning mirrors and a correction circuit that removes distortions caused by interaction between the scanning mirrors. Preferably, the first scanning mirror is oriented to cause an angular displacement in the output laser beam in an X-direction with respect to a Z-axis and the second scanning mirror is oriented to cause an angular displacement in a Y-direction with respect to the Z-axis. Preferably, the first scanner mirror is an off-axis mirror that is positioned to produce a single, substantially invariant pupil on the second scanning mirror. The scanner preferably uses a reflective beam expander to magnify an input laser beam received from a laser source.

In a first embodiment, the correction circuit implements a quadratic approximation of the geometric distortions caused by interaction of the scanning mirrors. The correction circuit implements the quadratic approximation in real-time using analog multipliers and adders. In a second embodiment, the correction circuit is implemented in real time digitally using a programmable logic device (PLD) and a memory unit for each scanning mirror. Each memory unit stores a table of correction values that are summed with uncorrected values by the PLD to set the scanning mirrors at the correct mirror angles.

Figure 2:
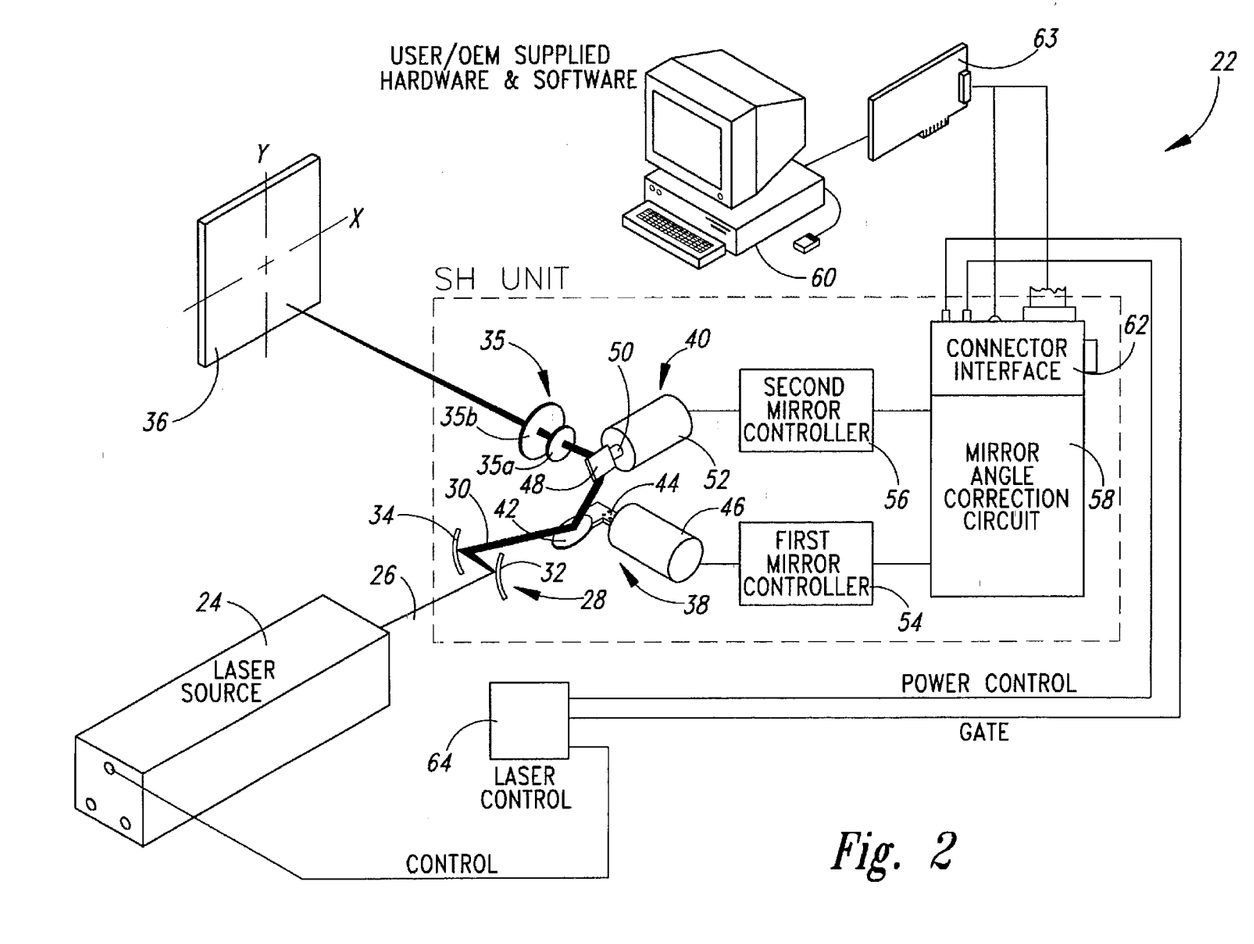
FIG. 2 is a schematic diagram of a laser scanner according to a first embodiment of the present invention.

A laser scanner 22 in accordance with the present invention is shown in FIG. 2, and includes a laser source 24 that produces an input laser beam 26. The input laser beam 26 is directed to a beam expander 28 which produces an expanded input laser beam 30. Preferably, the beam expander is reflective and includes two spherical mirrors 32, 34. The spherical mirrors are inexpensive optical elements relative to the infrared lenses required in prior art designs. The spherical mirrors are operated 5° off-axis to produce a Z-folded beam path that increases the length of the laser beam between the laser source 24 and a focusing lens 35. This places the focusing lens 35 farther away from the near field of the laser source 24 and results in a cleaner focused spot on an object 36 being scanned.

The expanded input laser beam 30 is directed to a first scanning mirror assembly 38 which deflects the expanded input laser beam to a second scanning mirror assembly 40. The first scanning mirror assembly 38 includes a first scanning mirror 42 mounted on a rotatable motor shaft 44 of a servomotor 46. Similarly, the second scanning mirror assembly 40 includes a second scanning mirror 48 mounted on a rotatable motor shaft 50 of a servomotor 52. The motor shaft 50 of the second scanning mirror assembly 40 is oriented orthogonally with respect to the motor shaft 44 of the first scanning mirror assembly 38. The orthogonal arrangement of the motor shafts allows the first scanning mirror 42 to control the direction of the output laser beam in an X dimension and allows the second scanning mirror 48 to control the direction of the output laser beam in a Y dimension, as indicated on the scanned object 36.

Preferably, the first scanning mirror 42 is mounted off-axis, i.e., is mounted asymmetrically on the motor shaft 44, as shown in FIG. 2. By mounting asymmetrically, the first scanning mirror 42 rotates about a non-central axis, which allows the first scanning mirror to deflect the expanded input laser beam 30 onto a fixed area of the second scanning mirror 48 for all mirror angles of the first scanning mirror. In other words, rotation of the first scanning mirror 42 about a non-central axis creates a single, substantially invariant laser beam pupil on the second scanning mirror 48. Creating a single pupil using an off-axis scanning mirror is discussed in more detail in U.S. Pat. No. 3,764,192, which is incorporated by reference herein in its entirety.

The second scanning mirror 48 deflects the laser beam through the focusing lens 35 onto the scanned object 36. The focusing lens preferably is an Fθ lens, having from 1–3 optical elements, such as the two optical elements 35A, 35B shown in FIG. 2. The focusing lens can be manufactured from an optical material, such as Zinc Selenide (ZnSe) having transmission in all laser frequency bands, or separate lenses can be used according to the laser beam frequency. Separate interchangeable lenses, made from germanium for $CO_2$ lasers and optical glass for YAG lasers, are usually the more economical choice. If a common Zinc Selenide lens is used, it can be coated for high transmission in both regions. This Fθ focusing lens preferably is designed for extreme linearity between input angle and image position, e.g., one part in 5000, leaving scan mirror geometric distortions as the only significant error as will be discussed below.

Figure 4A:
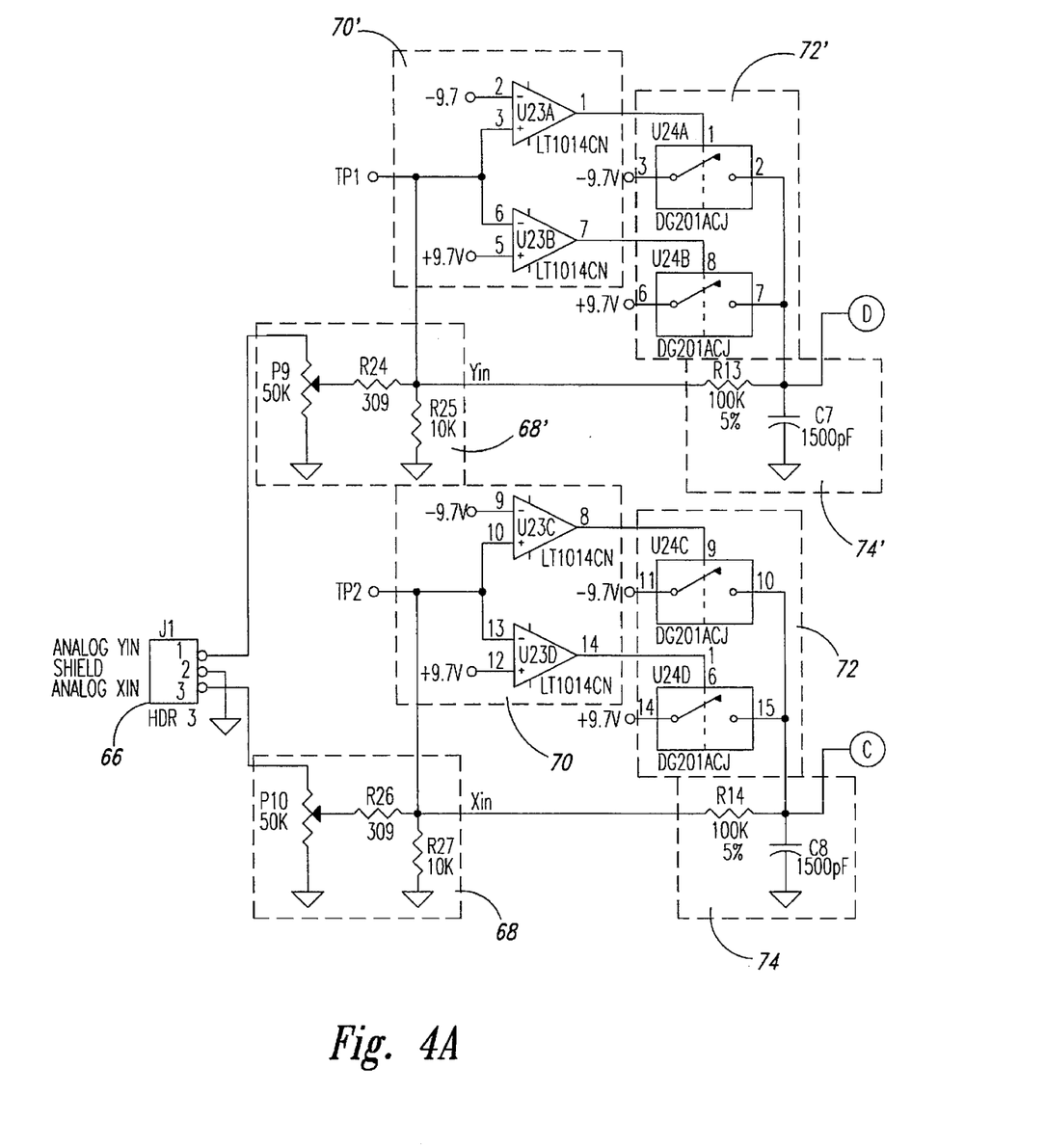
FIGS. 4A–4D together are a circuit diagram of a correction circuit used in the laser scanner of FIG. 2.

The first and second scanning mirror assemblies 38, 40 are controlled by first and second mirror controllers or servomechanisms 54, 56, respectively. The servomechanisms 54, 56 send appropriate voltage signals to the respective servomotors 46, 52 which rotate the first and second scanning mirrors 42, 48 according to the voltage values supplied by the servomechanisms. The servomechanisms receive signals from a mirror angle correction circuit 58, which is discussed in more detail below with respect to FIG. 4. The mirror angle correction circuit 58 is connected to a user-operated computer 60 via a connector interface 62. The computer 60 includes a digital/analog converter board 63 which converts digital data from the computer 60 to analog data for use by the mirror angle correction circuit 58. The connector interface is also connected to a laser controller 64 which controls the power and modulating or chopping frequency of the input laser beam produced by the laser source 24. Such a laser controller is well known in the art, as exemplified by a UC1000 laser controller manufactured and sold by Synrad, Inc.

Figure 3A:
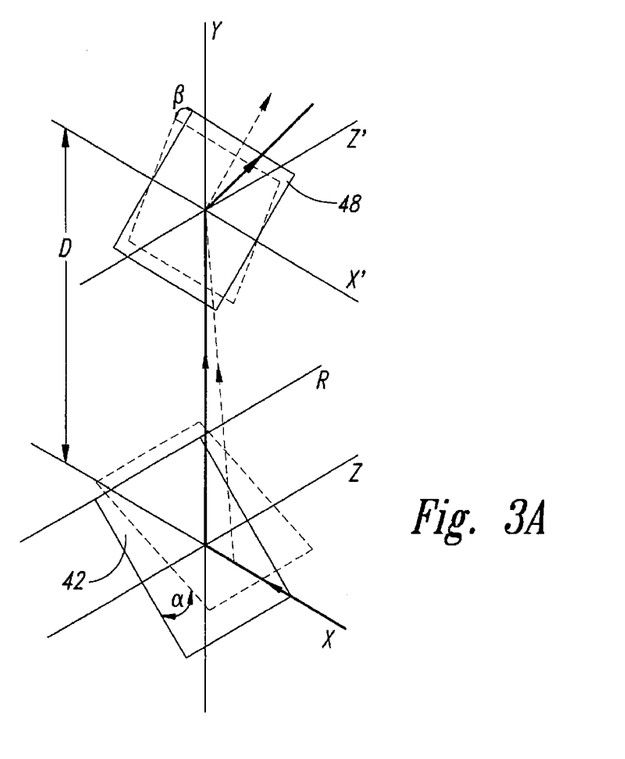
FIG. 3A is a perspective view of first and second scanning mirrors used in the laser scanner of FIG. 2.
Figure 3B:
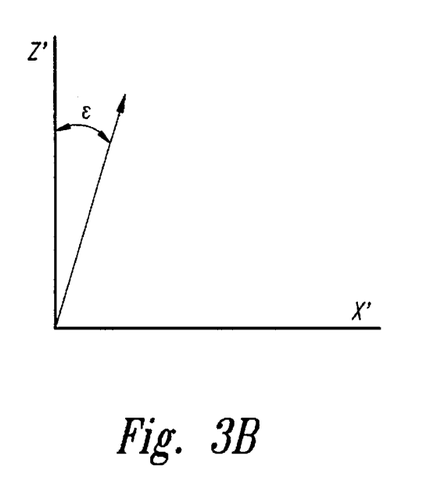
FIG. 3B is a side elevation view in an X'Z plane of an output laser beam produced by the laser scanner of FIG. 2.
Figure 3C:
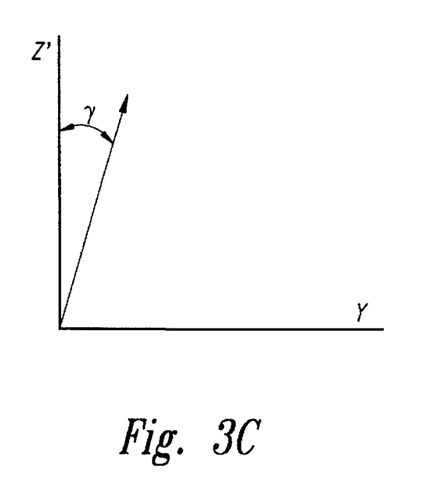
FIG. 3C is a side elevation view in a Y'Z plane of the output laser beam shown in FIG. 2.

The geometries of the first and second scanning mirrors 42, 48 are shown in the schematic diagram of FIG. 3A. The first scanner mirror 42 rotates about a rotation axis R of the servomotor shaft 44 (not shown in FIG. 3A). By pivoting the first scanning mirror about the rotation axis R located at one end of the scanning mirror, the pupil astigmatism exhibited on the second scanning mirror 48 by the deflected laser beam is greatly reduced compared to prior art systems that pivot the first scanning mirror about a central axis. The second scanning mirror 48 is positioned so that the pupil of the laser beam deflected onto the second scanning mirror is centered about the center of the second scanning mirror. Unlike the first scanning mirror, the second scanning mirror rotates about its central axis. The rotation of the first scanning mirror at a mirror angle α and the second scanning mirror at a mirror angle β causes the output laser beam to be directed in an output direction that is a function of both mirror angles. The output direction is preferably substantially in a Z'-direction at a field angle ε with respect to an X'-axis, as shown in FIG. 3B, and a field angle γ with respect to a Y axis, as shown in FIG. 3C. The X'-, Y'- and Z'-axes are mutually perpendicular to each other, although obviously the labels used for each of the axes are arbitrary and can be switched according to the orientation of the mirrors.

It should be appreciated that even though the rotation of the first scanning mirror 42 about a non-central rotation axis R produces substantially one pupil on the second scanning mirror 48, all field distortions are not eliminated. The two scanning mirrors interact, as the imaging displacement in each direction (X, Y) is affected by the angles of both scanning mirrors. Equations 1 and 2 below, mathematically describe the relationships between the field angles ε and γ and the mirror angles α and β. For the equations, the mirror angles α and β are defined as the angular displacement with respect to a 45° angle. In other words, when α and β are each zero, the first and second scanning mirrors are each positioned at an angle of 45° with respect to their rotation axes.
Equation 1

$$\sin\varepsilon\sin 2\alpha - \sin\gamma\cos 2\beta + \cos\left[ 2\arccos\left( \frac{\sqrt{2}}{2} \cos 2\alpha(\cos\beta - \sin\beta) \right) \right] = 0$$

Equation 2

$$(\sin\varepsilon\cos 2\alpha + \sin\gamma\sin 2\alpha)(\cos\beta + \sin\beta) - \sqrt{1 - \sin^2\varepsilon - \sin^2\gamma}\ \sin 2\alpha(\sin\beta - \cos\beta) = 0$$

It should be appreciated that the distance between the two mirrors, D, is absent from these equations. Therefore, the field angles do not depend on the distance D. As a result, one can conclude from the equations that rotation the first scanning mirror 42 about its non-central rotation axis R does not introduce any extra distortions.

It would be desirable to use Equations 1 and 2 to position the first and second scanning mirrors 42, 48 at the proper mirror angles α, β based on the desired field angles ε, γ. However, those equations are very difficult to implement in an analog circuit. Not only are there no simple circuit components available to perform the trigonometric functions, but it is also almost impossible to solve the two equations in real-time due to the complexity of the equations. In addition, an analog circuit of the required complexity would suffer from noise problems, tolerance variations, and non-linearity of the circuit components. However, the equations can be approximated by expanding them to the third order to produce the following Equations 3 and 4:
Equation 3

$$\alpha = 0.5\varepsilon - 0.0845\varepsilon\gamma^2$$

Equation 4

$$\beta = 0.5\gamma + 0.171\gamma\varepsilon^2$$

Equations 3 and 4 can be implemented with multipliers that are commonly available as electronic components. The error of Equations 3 and 4 as compared to the ideal trigonometric form of Equations 1 and 2 is less than 1 part in 2,000.

The computer 60 generates a series of desired field angles ε, γ depending upon the desired function of the laser scanner 22. For example, the user of the computer may desire to mark a part number on the object being scanned. The user programs the computer to generate the desired field angles ε, γ that cause the laser scanner to form the digits of the part number. The desired angles are converted by the digital/analog converter board 63 to analog voltage values $X_{in}$, $Y_{in}$, which are sent to the connector interface 62.

The analog voltage values $X_{in}$, $Y_{in}$ are input into the mirror angle correction circuit 58 via a connector 66 (FIG. 4A) which is coupled to the connector interface 62 (FIG. 2). It should be appreciated that the circuit of FIGS. 4A–4D show separate circuit elements for the respective analog voltage values $X_{in}$, $Y_{in}$. To distinguish the respective circuit elements, the circuit elements for the $Y_{in}$ analog voltage value include a prime (') after its reference number. As shown in FIG. 4A, each analog voltage value $X_{in}$, $Y_{in}$ then proceeds through a voltage scaling network 68, 68' which reduces a full-scale 10 V signal to 9.70 V so that output signals $V_x$, $V_y$ of the correction circuit do not exceed +10 V (so as not to overdrive the input of servomechanism 54). The signal from each voltage scaling network is then compared to ±9.7 V by a comparator circuit 70, 70'. If the signal exceeds ±9.7 V, each comparator circuit will activate an analog switch 72, 72' and clamp the input to 9.70 V until the overvoltage condition ceases. If there is no overvoltage condition, the signal from each voltage scaling network 68, 68' travels through a first-order low-pass filter 74, 74' and into an input of a buffer 76, 76'. Each buffer 76, 76' outputs a bipolar signal $X_B$, $Y_B$ that splits into three separate paths leading to: an absolute value circuit 78, 78', a comparator 80, 80', and an inverter 82, 82'.

Figure 4B:
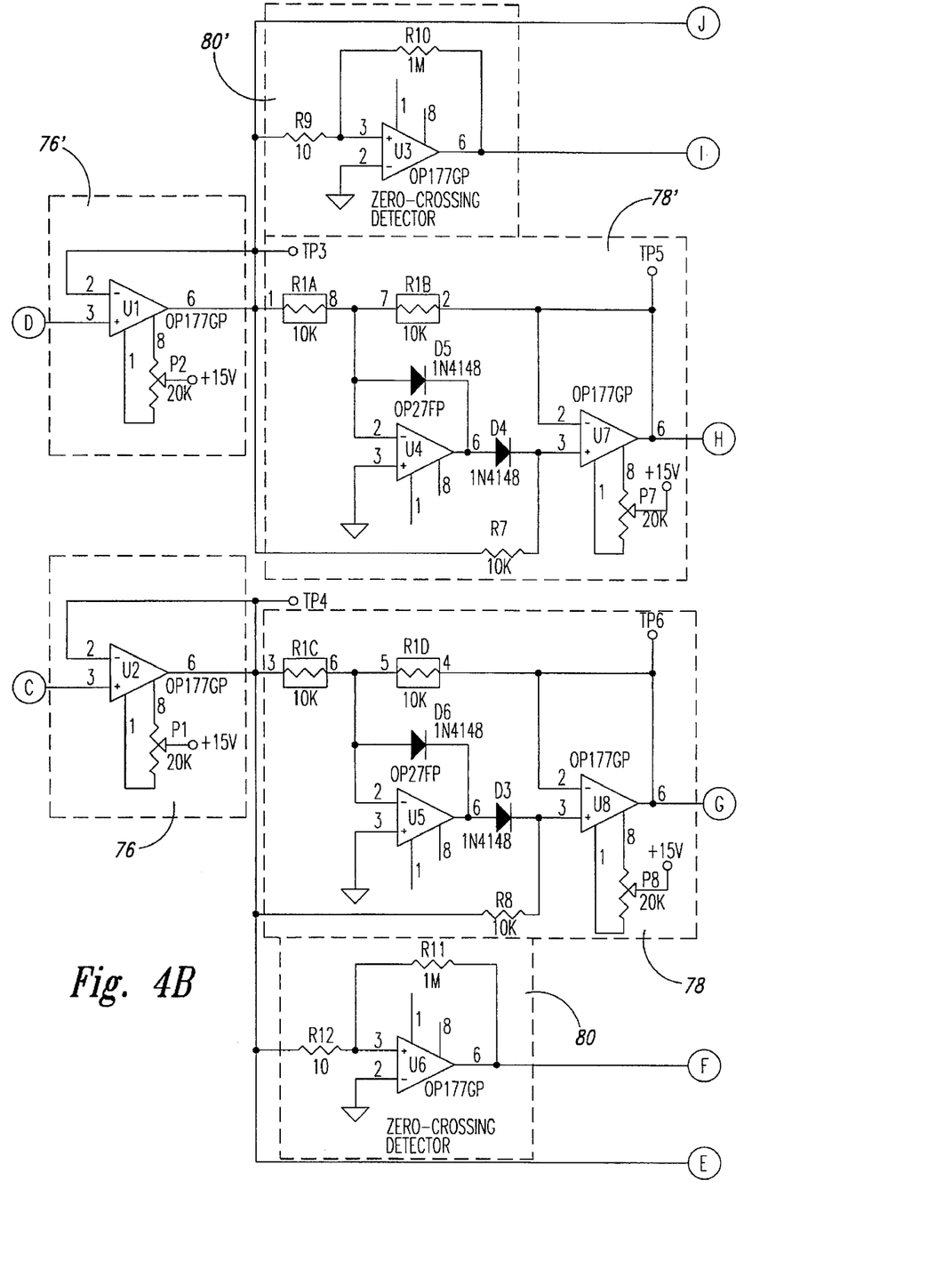
Figure 4C:
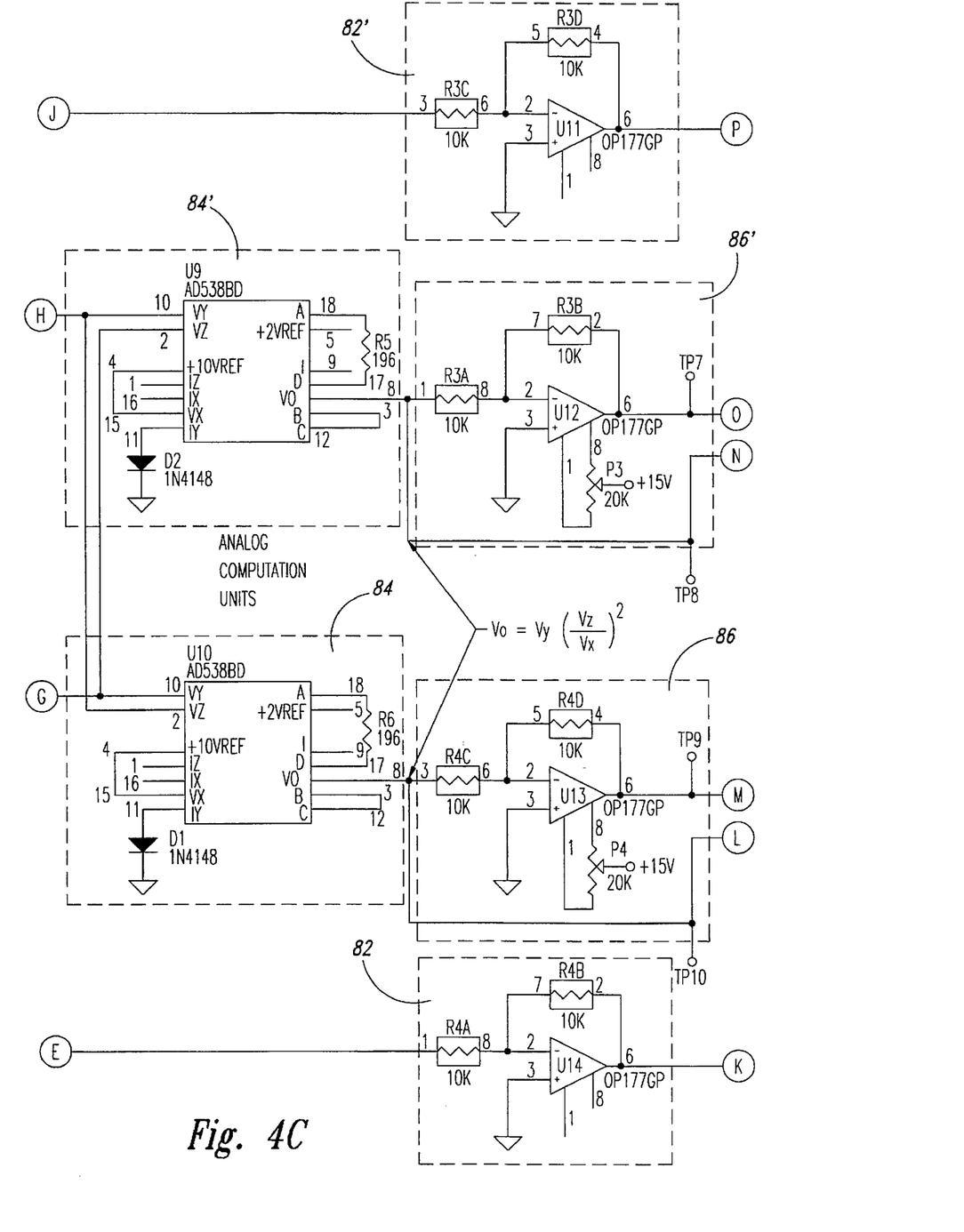

Each absolute value circuit 78, 78' is used as a precision rectifier to transform a respective bipolar signal $X_B$, $Y_B$ output from the buffer 76, 76' into a unipolar signal $X_U$, $Y_U$ that is transmitted to an analog computation unit (ACU) 84, 84' (FIGS. 4B–4C). The transformation is required because each analog computation unit 84, 84' is a single quadrant device. Each analog computation unit 84, 84' can be any well-known device, as exemplified by the AD538BD analog computation unit sold by Analog Devices, Inc. For the $X_{in}$ voltage value, the ACU 84, 84' multiplies the unipolar signal $X_u$ with a unipolar signal $Y_u$ and a constant (+10 V). The output $Vo_x$, $Vo_y$ of each ACU has the form:

$$Vo_x = X_u \left( \frac{Y_u}{10} \right)^2 = 0.01 X_u Y_u^2$$

$$Vo_y = Y_u \left( \frac{X_u}{10} \right)^2 = 0.01 Y_u X_u^2$$

Figure 4D:
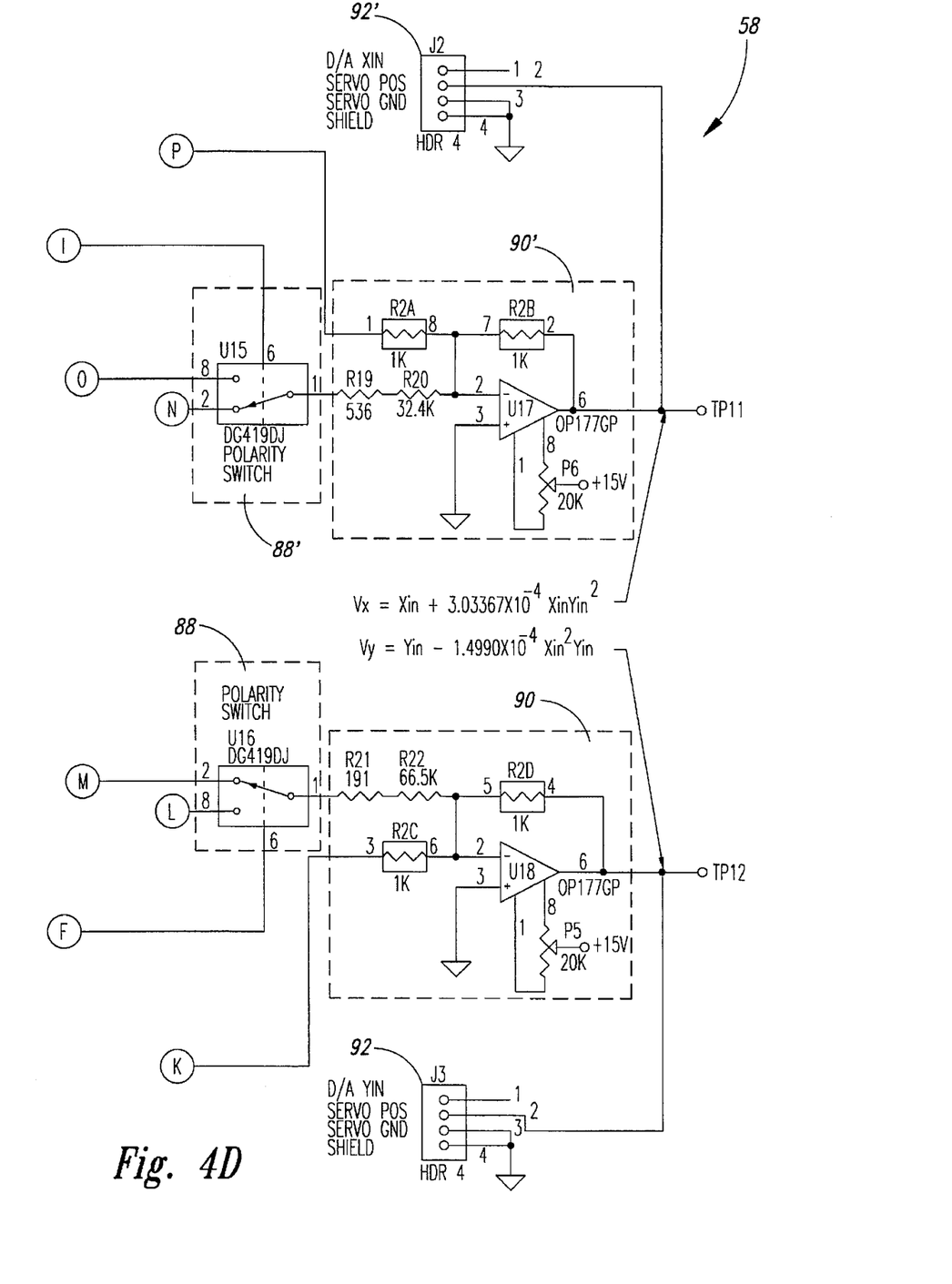

The output signal $Vo_x$ is inverted by an inverter 86 and then proceeds via a switch 88 into an output summing amplifier 90 (FIGS. 4C–4D). The output signal $Vo_y$ proceeds via a switch 88' into an output summing amplifier 90' without being inverted because the inverter 86' is decoupled by the switch 88'. The output $V_x$, $V_y$ of each summing amplifier 90, 90' will be in the form:

$$V_x = X_u - k X_u Y_u^2$$

$$V_y = Y_u + k'Y_u X_u^2$$

where k is determined as follows:

$$k = \frac{0.01R2D}{R_{switch} + R21 + R22} = \frac{0.01*1000}{R_{switch} + 191 + 66500} = 1.4990 \times 10^{-4}$$

$$k = \frac{0.01*R2B}{R_{switch} + R19 + R20} = \frac{0.01*1000}{20 + 536 + 32400} \approx 3.03367 \times 10^{-4}.$$

The resistance value $R_{switch}$ is the resistance of each switch 86, 86', the resistors R2D, R21, and R22 are part of the summing amplifier 90, and the resistors R2B, R19, and R20 are part of the summing amplifier 90'. The summing amplifier 90 transmits an output voltage $V_x$ to a connector 92 connected to the first servomechanism 54. Similarly, the summing amplifier 90' transmits the output voltage $V_y$ to a connector 92' connected to the second servomechanism 56.

The comparator 80 is used as a zero-crossing detector (with hysteresis) to detect the polarity of the signal $X_B$ from the buffer 76 and will switch the inverter 86 into the circuit when the signal goes negative. This is necessary because the signal has no polarity after it passes through the absolute value circuit 78. The inverter 82 simply inverts the signal from the buffer 76. The inversion is needed because the summing amplifier 90 inverts the inverted signal again, so the result will be the original (uninverted) signal. The comparator 80' and the inverter 82' perform similar functions for the signal $Y_B$ except the polarities are reversed.

Table 1 below shows a conversion of Equations 3 and 4 from a determination of the mirror angles $\alpha$, $\beta$ in degrees to a determination of the output voltages $V_x$, $V_y$ that are passed from the mirror angle correction circuit 58 to the first and second servomechanisms 54, 56. It will be appreciated that the $X_{in}$ and $Y_{in}$ input values are the voltage values that would be necessary if there were no field distortions. Similarly, the uncorrected scanning mirror angles $\Phi_x$, $\Phi_y$ shown in Table 1 are the mirror angles that would result without using the mirror correction circuit 58.

TABLE 1

$\alpha, \beta \equiv$ Corrected Scanning Mirror Angles
$\epsilon, \gamma \equiv$ Desired Scanning Field Angles
$\Phi_x, \Phi_y \equiv$ Uncorrected Scanning Mirror Angles
$V_x, V_y \equiv$ Corrected Servo Input Voltages

| First Scanning Mirror | Comment |
|---|---|
| $\alpha = \frac{1}{2} \epsilon - 0.08450\epsilon\gamma^2$; | Equation 3 |
| $\alpha = \frac{1}{2} (2\Phi_x) - 0.0845(2\Phi_x)(2\Phi_y)^2$;  $\Phi = \frac{1}{2}\gamma$ | |
| $\alpha = \Phi_x - 0.676\Phi x \Phi_y^2$; | Scanning angle in radians |
| $\alpha = \Phi_x - 0.676 \left(\frac{\pi}{180}\right)^2 \Phi_x\Phi_y^2$ | $2\pi\text{rad} = 360°$ |
| $\alpha = \Phi_x - 2.059 \times 10^{-4} \times \Phi_x\Phi_y^2$; | Scanning angle in degrees |
| $\alpha = \Phi_x - 2.059 \times 10^{-4} \left(\frac{1}{1.172}\right)^2 \Phi_x\Phi_y^2$; | Servo scale = 1.172 V/deg |
| $V_x = X_{in} - 1.4990 \times 10^{-4}X_{in}^2 Y_{in}^2$; | Corrected servo input voltage |

| Second Scanning Mirror | Comment |
|---|---|
| $\beta = \frac{1}{2}\gamma + 0.171\gamma\epsilon^2$; | Equation 4 |

TABLE 1-continued

| | |
|---|---|
| $\beta = \frac{1}{2} 2\Phi_y + 0.171(2\Phi_y)(2\Phi_x)^2$; | $\Phi = \frac{1}{2}\gamma$ |
| $\beta = \Phi_y + 1.368\Phi_y\Phi_x^2$; | Scanning angle in radians |
| $\beta = \Phi_y + 1.368 (\pi/180)^2 \Phi_y\Phi_x^2$; | $2\pi\text{rad} = 360°$ |
| $\beta = \Phi_y + 4.167 \times 10^{-4}\Phi_y\Phi_x^2$; | Scanning angle in degrees |
| $\beta = \Phi_y + 4.167 \times 10^{-4} \left(\frac{1}{1.172}\right)^2 \Phi_y\Phi_x^2$; | Servo scale = 1.172 V/deg |
| $V_y = Y_{in} + 3.03367 \times 10^{-4}Y_{in}X_{in}^2$; | Corrected servo input voltage |

The implementation of Equations 3 and 4 by the analog correction circuit 58 shown in FIGS. 4A–4D produces an accurate output scanning laser beam. However, the accuracy of the analog correction circuit is less than optimal for two reasons. First, Equations 3 and 4 only approximately represent the distortions in the system, so the correction provided by the analog correction circuit is only approximate. Second, analog circuits generate internal noise and the circuit components do not produce perfect results because analog components vary in value and are never perfectly linear in nature.

Figure 5:
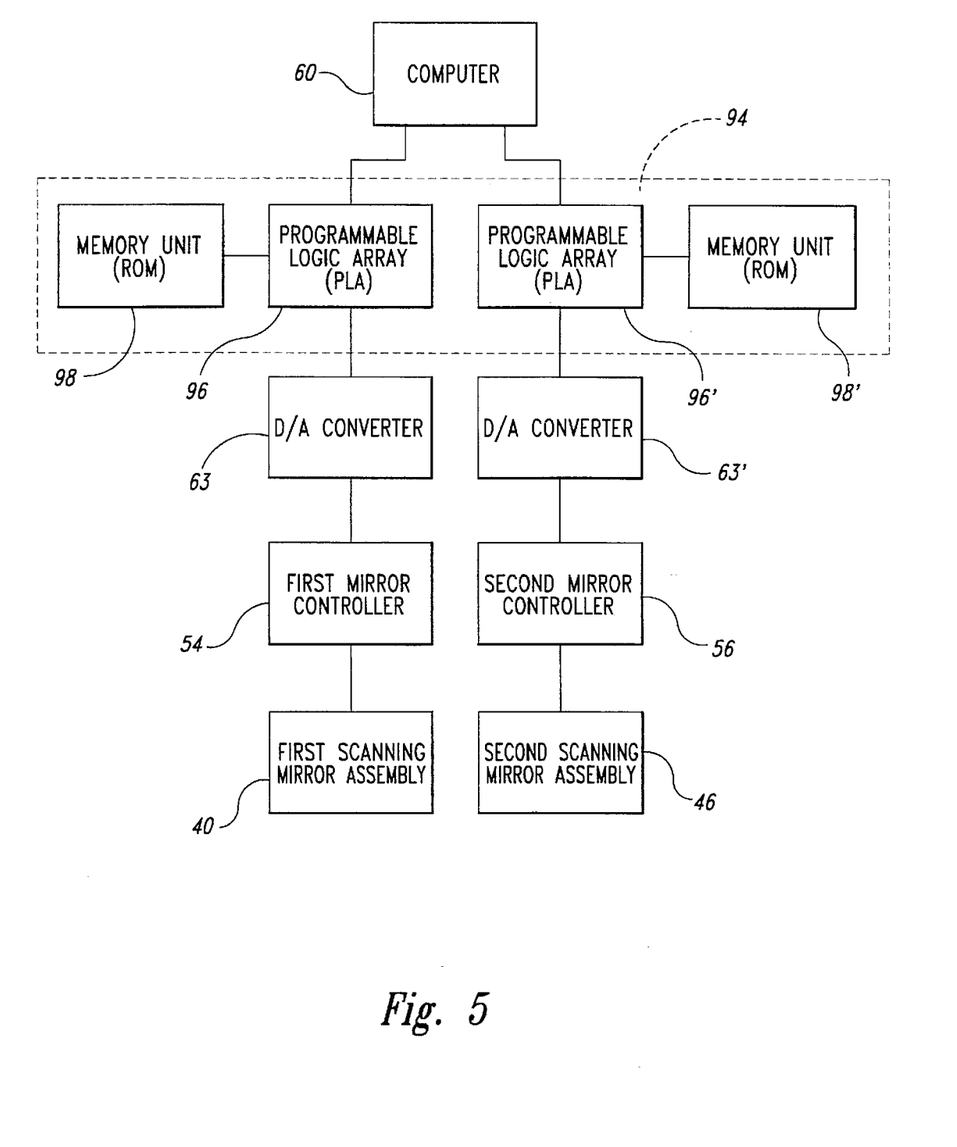
FIG. 5 is a block diagram of a laser scanner according to a second embodiment of the present invention.

In an alternate embodiment, the invention employs a digital correction circuit 94 as shown in FIG. 5. The digital correction circuit 94 is based on Equations 1 and 2 above which mathematically describe the exact relationships between the field angles $\epsilon$ and $\gamma$ and the mirror angles $\alpha$ and $\beta$, rather than the approximate relationships described in Equations 3 and 4. As a result, the digital correction circuit 94 provides more accurate distortion elimination than the analog correction circuit 58 shown in FIGS. 4A–4D. Alternatively, the digital correction circuit 94 can be based on the approximate relationships described in Equations 3 and 4.

In order to implement the relationships described in Equations 1 and 2, Equations 1 and 2 are solved for the mirror angles $\alpha$ and $\beta$ to obtain the following Equations 5 and 6, respectively.

Equation 5

$$\alpha = \epsilon + f(\epsilon, \gamma)$$

Equation 6

$$\beta = \gamma + g(\epsilon, \gamma)$$

As shown in Table 1, Equations 5 and 6 can be converted from angles to voltages based on the servo scale of the servomotors 46 and 52 (e.g., 1.172 V/deg). Such conversion results in the following Equations 7 and 8 where $V_{xd}$ and $V_{yd}$ are the corrected voltage values needed to set the corrected mirror angles $\alpha$, $\beta$, respectively, and $X_{ind}$, $Y_{ind}$ are the uncorrected input values corresponding to the field angles $\epsilon$, $\gamma$, respectively. $X_{ind}$ and $Y_{ind}$ are represented by digital numbers as are $f(X_{ind}, Y_{ind})$ and $g(X_{ind}, Y_{ind})$. $V_{xd}$ and $V_{yd}$ are converted from digital form to voltages using a digital to analog D/A converter.

Equation 7

$$V_{xd} = X_{ind} + f(X_{ind}, Y_{ind})$$

Equation 8

$$V_{yd} = Y_{ind} + g(X_{ind}, Y_{ind})$$

The digital correction circuit 94 includes programmable logic devices (PLDs) 96, 96' and memory units 98, 98' that implement Equations 5 and 6. Numerous types of PLD could be used, such as the XC7300 EPLD family of PLDs from Xilinx, Inc. The memory units 98, 98' are read-only memory (ROM) units, but any type of memory unit could be employed. The memory units 98, 98' store correction value tables that include correction values calibrated for each combination of field angles $\epsilon$, $\gamma$. The correction values are the results obtained from functions $f(\epsilon,\gamma)$ and $g(\epsilon,\gamma)$ of Equations 5 and 6 for each combination field angles $\epsilon$, $\gamma$. It will be appreciated that the functions $f(X_{ind}, Y_{ind})$ and $g(X_{ind}, Y_{ind})$ could employ the approximate values shown in Equations 3 and 4, such that $f(\epsilon,\gamma) = -0.084\epsilon\gamma^2$ and $0.171\gamma\epsilon^2$.

The computer 60 generates a series of desired field angles $\epsilon,\gamma$ depending on the desired function of the laser scanner 22. It will be appreciated that the digital correction circuit 94 works in the digital domain, however the values generated by the computer 60 can be thought of as field angles $\epsilon,\gamma$, uncorrected input voltages $X_{ind}$, $Y_{ind}$, or even Cartesian coordinates of the object being scanned. The digital/analog converter 63, 63' converts the digital values to the corrected output voltages $V_x$, $V_y$ for use by the motor controllers. For simplicity, the remainder of the discussion assumes that the digital correction circuit 94 receives field angles $\epsilon$, $\gamma$ and outputs mirror angles $\alpha$, $\beta$. Conversion to corrected output voltages $V_x$, $V_y$ is accomplished by the D/A converters 63, 63'.

Each PLA 96, 96' inputs the field angles $\epsilon$, $\gamma$ from the computer 60. Each PLA 96, 96' uses the field angles as indices into the correction value table stored in the respective memory unit 98, 98' for the PLA 96, 96'. The PLA 96 obtains a correction value representing the result produced by the function $f(\epsilon,\gamma)$ for the input field angles $\epsilon,\gamma$. The PLA 96 adds the correction value to the input field angle $\epsilon$ (or 0.5 times the field angle $\epsilon$ if the approximate Equation 3 is used) to obtain the corrected mirror angle $\alpha$. The PLA 96 sends the corrected mirror angle $\alpha$ to the D/A converter 63, which converts the corrected mirror angle $\alpha$ to the corrected output voltage value $V_x$. The D/A converter 63 sends the corrected output voltage $V_x$ to the first mirror controller 54 which causes the first scanning mirror 42 to be angled at the corrected mirror angle $\alpha$.

The process for positioning the second scanning mirror 48 at the corrected mirror angle $\beta$ is similar to that described above for the corrected mirror angle $\alpha$. The PLA 96' uses the field angles $\epsilon$, $\gamma$ as indices into the correction value table stored in the memory unit 98' to obtain the appropriate correction value. The appropriate correction value will be the result calibrated for the function $g(\epsilon,\gamma)$ for the particular field angles $\epsilon,\gamma$ received from the computer 60. The PLA 96' adds the correction value retrieved to the input field angle $\gamma$ (or 0.5 times the field angle $\gamma$ if the approximate Equation 4 is used) to obtain the corrected mirror angle $\beta$. The corrected mirror angle $\beta$ is sent to the D/A converter 63' which converts the corrected mirror angle $\beta$ to the corrected output voltage value $V_y$. The D/A converter 63' sends the corrected output voltage value $V_y$ to the second mirror controller 56 which causes the second scanning mirror 48 to be angled at a mirror angle $\beta$.

Figure 6:
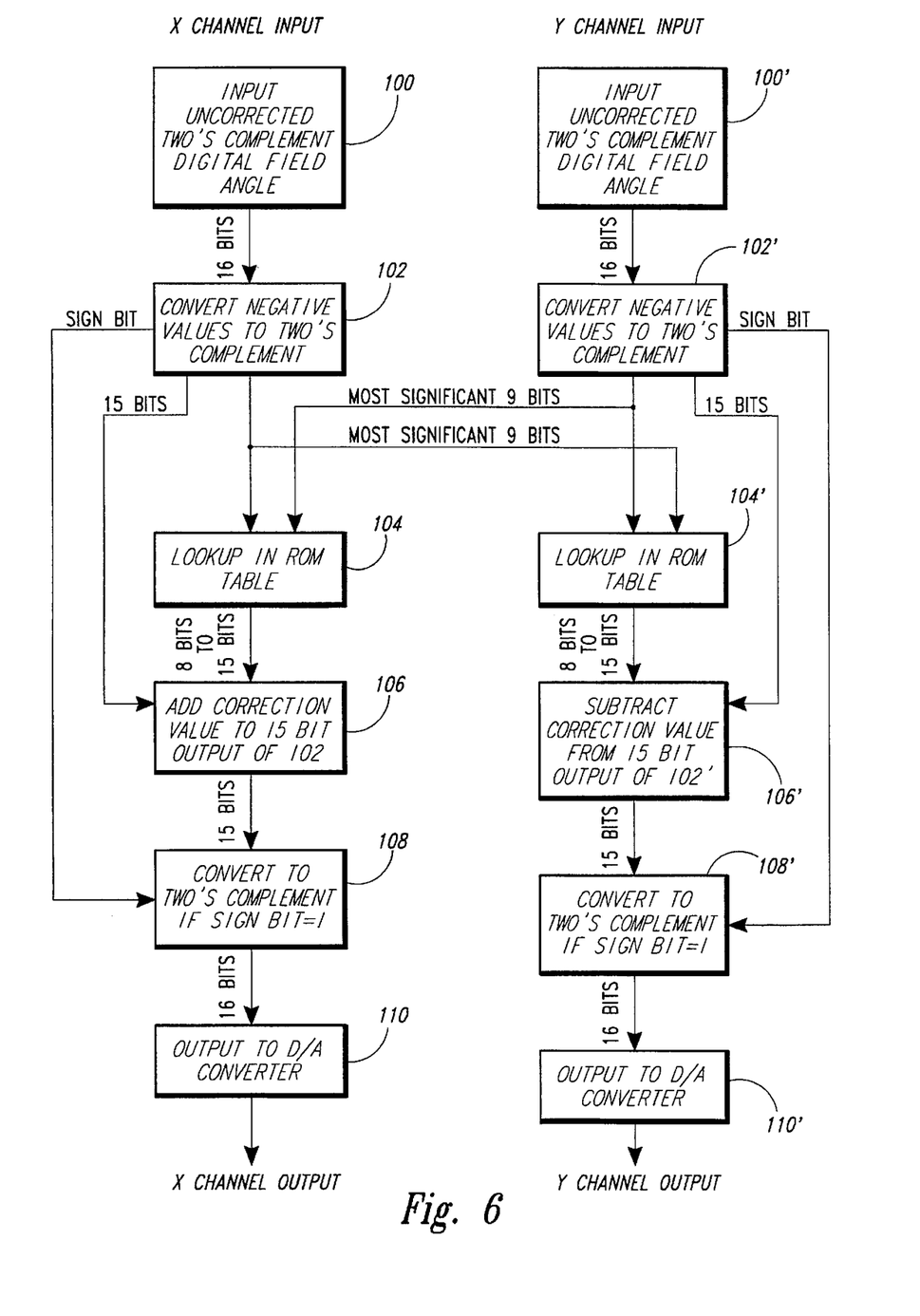
FIG. 6 is a flow diagram of a method of operation of the laser scanner of FIG. 5.

Shown in FIG. 6 is a flow diagram of the method performed by the digital correction circuit 94 to obtain the corrected mirror angles $\alpha,\beta$. In steps 100, 100', the PLAs 96, 96' input the uncorrected digital field angles $\epsilon,\gamma$ from the computer 60. In a preferred embodiment, the digital field angles $\epsilon,\gamma$ are 16-bit values, although it will be appreciated that other word lengths could also be used. In steps 102, 102', the PLAs 96, 96' convert the field angles $\epsilon,\gamma$ into two's complement values if $\epsilon,\gamma$ are negative. Polarity information is preserved as single bit values.

In steps 104, 104', the PLAs 96, 96' use the unsigned integers for the field angles $\epsilon,\gamma$ produced in steps 102, 102' as indices into the correction value tables stored in the memory unit 98, 98'. It would be desirable to use all 15 bits of each unsigned integer as indices, but current ROM units are unable to handle 30 address lines. Current ROM units are able to handle 18 address lines and 9 bits per unsigned integer yields a maximum error of less than 0.025% on the scanner 22. Alternatively, accuracy could be improved by employing a mixed arrangement in which 10 bits are used for the field angle $\epsilon$ and 9 bits are used for the field angle $\gamma$ in step 104 while 9 bits are used for the field angle $\epsilon$ and 10 bits are used for the field angle $\gamma$ in step 104'.

In steps 106, 106', the correction values accessed in steps 104, 104' are added to the unsigned integer representations of the field angles $\epsilon,\gamma$ produced in steps 102, 102'. Preferably, the additions are performed with 15-bit correction values. However, if the correction values are small enough relative to the field angles $\epsilon,\gamma$, correction values with fewer bits may be used.

In step 118, 118', the 15-bit unsigned values resulting from the addition performed in steps 106, 106' are converted into 16-bit signed integers $\alpha,\beta$ using the signed bits preserved in steps 102, 102'. It should be appreciated that because $g(\epsilon,\gamma)$ is always negative in sign, subtraction is indicated in FIG. 6. Step 108 results in a corrected mirror angle $\alpha$ that is of the same polarity as the input field angle $\epsilon$. In step 110, the corrected mirror angle $\alpha$ is output to the D/A converter 63 which converts the mirror angle $\alpha$ into the corrected output voltage $V_x$. Similarly, step 108' results in a corrected mirror angle $\beta$ that is of the same polarity as the input field angle $\gamma$. In step 110', the corrected mirror angle 13 is output to the D/A converter 63' which converts the mirror angle $\beta0$ into the corrected output voltage $V_x$.

It will be appreciated that the present invention provides an inexpensive, accurate laser scanner for high-speed laser marking or positioning systems. The mirror angle correction circuit of the laser scanner provides a simple, inexpensive way to accurately angle the scanning mirrors of the laser scanner without needing the slow software correction schemes of prior an laser scanners. Further, by using an off-axis scanning mirror to reduce pupil astigmatism, the invention allows smaller optical elements to be used, which further reduces the cost of the scanner. In addition, the Z-folded beam path provided by the reflective beam expander increases the distance from the laser source to the focusing lens, thereby enabling the focusing lens to provide a more clearly focused beam spot on the object being scanned.

Although the present invention has been described with reference to one or more specific embodiments, it should be appreciated that various changes can be made by one of ordinary skill in the art without departing from the spirit of the invention. The scope of the invention is properly defined by the claims.

We claim:

1. A laser scanner for directing an output laser beam in an output direction in response to first and second uncorrected control signals, the output direction being at a first field angle $\gamma$ with respect to a first plane and at a second field angle $\epsilon$ with respect to a second plane orthogonal to the first plane, comprising:

a laser source producing an input laser beam heading along a first direction;

a first scanning mirror rotatable about a first axis parallel to the first plane, positioned to deflect the input laser beam, and angled at an angle $\alpha$ with respect to the second plane;

a second scanning mirror rotatable about a second axis parallel to the second plane and positioned to deflect the deflected input laser beam to produce the output laser beam, the second scanning mirror being angled at an angle $\beta$ with respect to the first plane;

a first scanning mirror controller coupled to the first scanning mirror and structured to adjustably control the angle $\alpha$ of the first scanning mirror in response to a first corrected control signal;

a second scanning mirror controller coupled to the second scanning mirror and structured to adjustably control the angle $\beta$ of the second scanning mirror in response to a second corrected control signal; and a digital correction circuit coupled to each of the first and second scanning mirror controllers, the correction circuit producing the first and second corrected control signals based on the first and second uncorrected control signals, sending the first corrected control signal to the first scanning mirror controller, and sending the second corrected control signal to the second scanning mirror controller, the digital correction circuit including:

a first memory unit storing correction values in a first correction value table; and a first programmable logic device that accesses a correction value in the first correction value table based on the first and second uncorrected control signals and adjusts the first uncorrected control signal with the correction value accessed from the first correction value table to obtain the first corrected control signal.

2. The laser scanner according to claim 1, further comprising a reflective beam expander positioned between the laser source and the first scanning mirror, the reflective beam expander magnifying the input laser beam.

3. The laser scanner according to claim 2 wherein the reflective beam expander includes two spherical mirrors positioned to form the input laser beam into a Z-folded beam path.

4. The laser scanner according to claim 1, further comprising a substantially linear F$\theta$ focusing lens positioned between the second scanning mirror and an object to be scanned, the focusing lens focusing the output laser beam on the object to be scanned.

5. The laser scanner according to claim 1 wherein the digital correction circuit further includes:

a second memory unit that stores correction values in a second correction value table; and a second programmable logic device that accesses an appropriate correction value in the second correction value table based on the first and second uncorrected control signals and adjusts the second uncorrected control signal with the correction value accessed from the second correction value table to obtain the second corrected control signal.

6. The laser scanner according to claim 1 wherein the first scanning mirror has a central point and is an off-axis mirror in that the first axis about which the first scanning mirror rotates is displace from the central point of the first scanning mirror.

7. The laser scanner according to claim 1 wherein the first scanning mirror is configured to produce a fixed pupil at the second scanning mirror.

8. A laser scanner for producing a scanning output laser beam in response to first and second uncorrected control signals, the laser scanner receiving an input laser beam from a laser source, the laser scanner comprising:

a reflective beam expander positioned to receive the input laser beam and produce an expanded laser beam;

a first scanning mirror positioned to deflect the expanded laser beam at a first angle with respect to a first direction;

a second scanning mirror positioned to deflect the deflected expanded laser beam at a second angle with respect to a second direction orthogonal to the first direction, and thereby produce the output laser beam;

a substantially linear F$\theta$ focusing lens positioned between the second scanning mirror and an object to be scanned, the focusing lens focusing the output laser beam on the object to be scanned;

a first scanning mirror controller for adjustably varying the first angle of the first scanning mirror in response to a first corrected control signal;

a second scanning mirror controller for adjustably varying the second angle of the second scanning mirror in response to a second corrected control signal; and a correction circuit that produces the first and second corrected control signals based on the first and second uncorrected control signals, transmits the first corrected control signal to the first scanning mirror controller, and transmits the second corrected control signal to the second scanning mirror controller, thereby causing the first and second mirror controllers to cause the first and second scanning mirrors to direct the output laser beam at the first and second angles with respect to the first and second directions.

9. The laser scanner according to claim 8 wherein the correction circuit includes means for calculating the first corrected control signal (designated $\alpha$) and the second corrected control signal (designated $\beta$) according to the following equations wherein $K_1$, $K_2$, $K_3$, and $K_4$ are constants and $\epsilon0$ and $\gamma$ are the first and second uncorrected signals, respectively:

$$\alpha = K_1 \epsilon - K_2 \epsilon \gamma^2$$

$$\beta = K_3 \gamma + K_4 \gamma \epsilon^2.$$

10. The laser scanner according to claim 8 wherein the correcting circuit corrects for geometric distortions of the first and second scanning mirrors using analog elements that implement a quadratic approximation of the geometric distortions.

11. The laser scanner according to claim 8 wherein the correction circuit includes:

a first memory unit storing correction values in a first correction value table; and a first programmable logic device that accesses a correction value in the first correction table based on the first and second uncorrected control signals and adjusts the first uncorrected control signal with the accessed correction value to obtain the first corrected control signal.

12. The laser scanner according to claim 8 wherein the first scanning mirror is an off-axis mirror in that the first scanning mirror rotates about a rotation axis that is displaced from a central point of the first scanning mirror.

13. The laser scanner according to claim 8 wherein the reflective beam expander includes two spherical mirrors positioned to form the input laser beam into a Z-folded beam path.

14. A laser scanner for directing an output laser beam in an output laser beam in an output direction, the output direction being at a first field angle $\epsilon$ from a Z'-axis in an X'-axis direction and at a second field angle $\gamma$ from the Z'-axis in a Y'-axis direction, wherein the X'-, Y'-, and Z'-axes are orthogonal to each other, comprising:

a laser source producing an input laser beam;

a reflective beam expander positioned to receive the input laser beam and magnify the input laser beam to produce an expanded laser beam heading along an X-axis parallel to the X'-axis;

a first scanning mirror rotatable about a Z-axis parallel to the Z'-axis, the first scanning mirror being positioned to deflect the expanded laser beam and angled at an angle $\alpha$ with respect to the X-axis, the Z-axis being displaced from a central axis extending through a central point of the first scanning mirror;

a first scanning mirror controller coupled to the first scanning mirror and structured to adjustably control the angle $\alpha$ of the first scanning mirror in response to a first control signal;

a second scanning mirror rotatable about the X'-axis and positioned to deflect the deflected laser beam to produce the output laser beam, the second scanning mirror being angled at an angle $\beta$ with respect to the Z'-axis;

a second scanning mirror controller coupled to the second scanning mirror and structured to adjustably control the angle $\beta$ of the second scanning mirror in response to a second control signal; and a digital correction circuit coupled to each of the first and second scanning mirror controllers, the digital correction circuit producing the first and second control signals based on the field angles $\epsilon$ and $\gamma$ and thereby causing the first scanning mirror controller to angle the first scanning mirror at the angle $\alpha$ and causing the second scanning mirror controller to angle the second scanning mirror at the angle $\beta$.

15. The laser scanner according to claim 14 wherein the reflective beam expander includes two spherical mirrors positioned to form the input laser beam into a Z-folded beam path.

16. The laser scanner according to claim 15, further comprising a substantially linear F$\theta$ focusing lens positioned between the second scanning mirror and an object to be scanned, the focusing lens focusing the output laser beam on the object to be scanned.

17. The laser scanner according to claim 14 wherein the digital correction circuit includes a calculating circuit that calculates the mirror angles $\alpha$ and $\beta$ according to the following equations wherein $K_1$, $K_2$, $K_3$, and $K_4$ are constants:

$$\alpha = K_1 - K_2 \epsilon \gamma^2$$

$$\beta = K_3 + K_4 \gamma \epsilon^2.$$

18. The laser scanner according to claim 14 wherein the correction circuit includes:

a first memory unit storing correction values in a first correction table; and a first programmable logic device that accesses a correction value in the first correction table based on the field angles $\epsilon$ and $\gamma$ and produces the first control signal based on the correction value accessed.

19. A laser scanner for producing a scanning output laser beam in response to first and second uncorrected control signals, the laser scanner receiving an input laser beam from a laser source, the laser scanner comprising:

a reflective beam expander positioned to receive the input laser beam and produce an expanded laser beam;

a first scanning mirror positioned to deflect the expanded laser beam at a first angle with respect to a first direction;

a second scanning mirror positioned to deflect the deflected expanded laser beam at a second angle with respect to a second direction orthogonal to the first direction, and thereby produce the output laser beam;

a first scanning mirror controller for adjustably varying the first angle of the first scanning mirror in response to a first corrected control signal;

a second scanning mirror controller for adjustably varying the second angle of the second scanning mirror in response to a second corrected control signal; and a correction circuit that produces the first and second corrected control signals based on the first and second uncorrected control signals, transmits the first corrected control signal to the first scanning mirror controller, and transmits the second corrected control signal to the second scanning mirror controller, thereby causing the first and second mirror controllers to cause the first and second scanning mirrors to direct the output laser beam at the first and second angles with respect to the first and second directions, wherein the correction circuit includes a digital element that produces the first and second control signals and wherein the correction circuit includes means for calculating the first corrected control signal (designated $\alpha$) and the second corrected control signal (designated $\beta$) according to the following equations wherein $K_1$, $K_2$, $K_3$, and $K_4$ are constants and $\epsilon$ and $\gamma$ are the first and second uncorrected signals, respectively:

$$\alpha = K_1 \epsilon - K_2 \epsilon \gamma^2$$

$$\beta = K_3 \gamma + K_4 \gamma \epsilon^2.$$

* * * * *